US012080478B2

(12) United States Patent
Yang et al.

(10) Patent No.: US 12,080,478 B2
(45) Date of Patent: Sep. 3, 2024

(54) GRADIENT Nd—Fe—B MAGNET AND A METHOD OF PRODUCTION

(71) Applicant: Yantai Shougang Magnetic Materials, Inc., Yantai (CN)

(72) Inventors: Kunkun Yang, Yantai (CN); Zhongjie Peng, Yantai (CN); Chuanshen Wang, Yantai (CN)

(73) Assignee: YANTAI SHOUGANG MAGNETIC MATERIALS INC., Yantai (CN)

( * ) Notice: Subject to any disclaimer, the term of this patent is extended or adjusted under 35 U.S.C. 154(b) by 1027 days.

(21) Appl. No.: 16/459,448

(22) Filed: Jul. 1, 2019

(65) Prior Publication Data

US 2020/0005996 A1 Jan. 2, 2020

(30) Foreign Application Priority Data

Jun. 29, 2018 (CN) ........................ 201810694252.7

(51) Int. Cl.
*H01F 41/02* (2006.01)
*B22F 3/24* (2006.01)
(Continued)

(52) U.S. Cl.
CPC ....... *H01F 41/0293* (2013.01); *H01F 1/0555* (2013.01); *H01F 1/0577* (2013.01); *H01F 7/0215* (2013.01)

(58) Field of Classification Search
None
See application file for complete search history.

(56) References Cited

U.S. PATENT DOCUMENTS

2005/0190031 A1* 9/2005 Miyata .................. H01F 7/0221 335/302
2011/0068651 A1* 3/2011 Miyata .................. H02K 1/278 310/156.43
(Continued)

FOREIGN PATENT DOCUMENTS

CN 106920611 A * 7/2017

OTHER PUBLICATIONS

Machine translation of CN 106920611A. (Year: 2017).*
Higashi, SAE International Journal of Alternative Powertrains, vol. 2, No. 2, p. 394-400. (Year: 2013).*

*Primary Examiner* — Xiaowei Su
(74) *Attorney, Agent, or Firm* — Dickinson Wright PLLC

(57) ABSTRACT

A gradient Nd—Fe—B magnet includes an Nd—Fe—B magnet block extending along a magnetization direction and having a plurality of surfaces perpendicular to the magnetization direction. A first film, is disposed on one of the surfaces. A second film is disposed on another one of the surfaces, opposite of the one of the surfaces. The first film and the second film are diffused into the Nd—Fe—B magnet block dividing the Nd—Fe—B magnet block into an edge region, a transition region, and a central region along a plane perpendicular to the magnetization direction wherein the edge region has a coercivity that remains constant in a direction perpendicular to the magnetization direction, and the coercivity, along said magnetization direction, gradually decreases from the one of the surfaces and the another one of the surfaces towards a point located therebetween. A method of making the gradient Nd—Fe—B magnet is disclosed herein.

20 Claims, 9 Drawing Sheets

(51) Int. Cl.
*H01F 1/055* (2006.01)
*H01F 1/057* (2006.01)
*H01F 7/02* (2006.01)

(56) References Cited

U.S. PATENT DOCUMENTS

2013/0002240 A1* 1/2013 Kogure .............. G01R 33/1223
324/201
2017/0213626 A1* 7/2017 Paranthaman ........ C22C 38/002

* cited by examiner

GRADIENT Nd—Fe—B MAGNET AND A METHOD OF PRODUCTION

CROSS REFERENCE TO RELATED APPLICATION

This application claims priority to Chinese Application Serial Number CN201810694252.7 filed on Jun. 29, 2018, the entire disclosure of which is incorporated herein by reference in its entirety.

BACKGROUND OF THE INVENTION

1. Field of the Invention

The present invention generally relates to a gradient Nd—Fe—B magnet and a method of making the gradient Nd—Fe—B magnet.

2. Description of the Prior Art

Nd—Fe—B magnets are well known in the art. Since its invention in 1983, Nd—Fe—B magnets are widely used in a variety of technologies including, but not limited to, computers, automotive, medical, and wind power. During the application of the Nd—Fe—B magnets, the residual magnetism of the Nd—Fe—B magnets decreases which negatively affects the application of the Nd—Fe—B magnets. It was observed that in many applications, the Nd—Fe—B magnets demagnetizesin the edge regions of the Nd—Fe—B magnets. Accordingly, increasing the coercivity of the edge region of the Nd—Fe—B magnets can improve the overall demagnetization resistance of the Nd—Fe—B during its application.

Currently, a diffusion process is widely used to increase the coercivity of the Nd—Fe—B magnets. The conventional diffusion process includes placing the Nd-e-B magnets in an environment containing heavy rare earth elements such as Dy or Tb and carrying out a high temperature diffusion and aging treatment. Accordingly, Dy or Tb are diffused from the grain boundary to the $Nd_2Fe_{14}B$ phase of the Nd—Fe B magnets thereby improving the magnetic anisotropy of the $Nd_2Fe_{14}B$ phase and effectively increasing the coercivity of the Nd—Fe—B magnets.

One such a process is disclosed in Chinese Patent CN101939804B. The process includes applying heavy rare earth elements to two sides or all sides that are parallel to the magnetization direction of the Nd—Fe—B magnet wherein the heavy rare earth elements is selected from an oxide of Dy or Tb, a fluoride of Dy or Tb, or an alloy containing Dy or Tb. After the diffusion process, the Nd—Fe—B magnets are machined in a directed perpendicular to the magnetization direction. The Nd—Fe—B magnets obtained from the diffusion process has a higher coercivity along its edges and a lower internal coercivity. However, the diffusion process applies the heavy rare earth material to two sides or all sides that are parallel to the magnetization direction of the Nd—Fe—B magnet which does not localize the repulsive region in the actual application of the Nd—Fe—B magnet to improve the coercivity. Instead, the diffusion process enhances the overall coercevity of the Nd—Fe—B magnets using diffusion to improve the demagnetization resistance of the Nd—Fe—B magnets during application. Using the diffusion process, the overall coating area of the heavy rare earth elements is large, and the overall use amount of heavy rare earth elements is relatively large. However, during the diffusion process, the direction of diffusion of heavy rare earth elements is perpendicular to the magnetization direction, and the range of high coercivity zones is completely controlled by the diffusion depth of heavy rare earth elements, resulting in poor controllability, and it is difficult to adjust the size range of the high coercivity zone according to the actual use environment of the Nd—Fe—B magnets.

SUMMARY OF THE INVENTION

The present invention overcomes the deficiencies mentioned above and provides a gradient Nd—Fe—B magnet. The present invention reduces the amount of heavy rare earth usage during the diffusion process while improves the demagnization resistance of the Nd—Fe—B magnet. The present invention further provides improved coercivity of the Nd—Fe—B magnets and improves the utilization of the heavy rare earth elements.

It is one aspect of the present invention to provide a gradient Nd—Fe—B magnet. The gradient Nd—Fe—B magnet includes an Nd—Fe—B magnet block extending along a magnetization direction and having a plurality of surfaces perpendicular to the magnetization direction. A first film, containing at least one heavy rare earth element, is disposed on one of the surfaces, attached to the Nd—Fe—B magnet block and extending along a periphery of the one of the surfaces. A second film, containing at least one heavy rare earth element, is disposed on another one of the surfaces, opposite of the one of the surfaces, attached to the Nd—Fe—B magnet block and extending along a periphery of the another one of the surfaces. The first film and the second film are diffused into the Nd—Fe—B magnet block dividing the Nd—Fe—B magnet block into an edge region, a transition region, and a central region along a plane extending perpendicular to the magnetization direction wherein the edge region has a coercivity that remains constant in a direction perpendicular to the magnetization direction, and the coercivity of the edge region, along the magnetization direction, gradually decreases from the one of the surfaces and the another one of the surfaces towards a point located between the one of the surfaces and the another one of the surfaces.

It is another aspect of the present invention to provide a method of making the gradient Nd—Fe—B magnet. The method includes a step of providing an Nd—Fe—B magnet block having a thickness of between 2-10 mm along a magnetization direction and having a plurality of surfaces perpendicular to the magnetization direction. The method also includes placing the Nd—Fe—B magnet block in a chamber containing an inert gas of argon with the magnetization direction of the Nd—Fe—B magnet block being arranged in a vertical direction. The method further includes a step of depositing a powder, containing at least one heavy rare earth element, on one of the surfaces. The next step of the method is forming a first film containing at least one heavy rare earth element on the one of the surfaces and along the periphery of the one of the surfaces. The step of forming the first film further includes a step of melting the powder on the one of the surfaces and along the periphery using a laser to form the first film and adhering the first film to the periphery. Then, the method follows with a step of removing excess powder from the one of the surfaces. After removing the excess powder, the Nd—Fe—B magnet block is rotated 180°. The method follows with a step of depositing the powder, containing at least one heavy rare earth element, on another one of the surfaces opposite of the one of the surfaces. Next, the method proceeds with a step of forming a second film containing the at least one heavy rare earth element on the another one of the surfaces and along a periphery of the another one of the surfaces. The step of forming the second film further includes a step of melting the powder on the another one of the surfaces and along the periphery using a laser to form the second film and adhering the second film to the periphery. Next, excess powder is removed from the another one of the surfaces. Then, the first film and the second film are diffused into the Nd—Fe—B magnet block under a vacuum environment or an inert environment containing argon and at a predetermined temperature.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
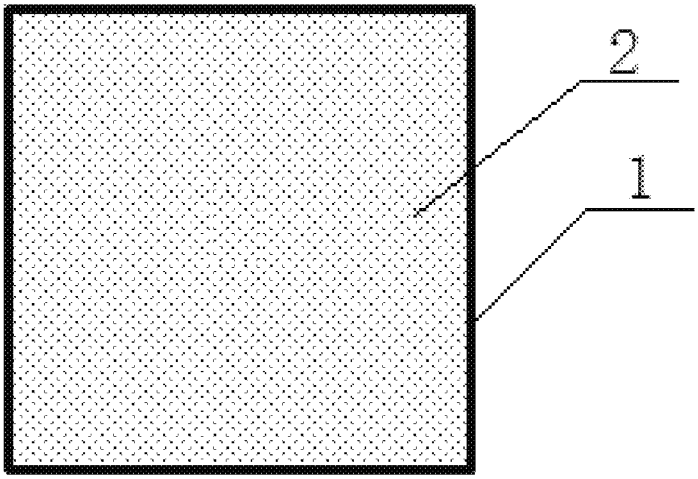
FIG. 1 is a top view of an Nd—Fe—B magnet block including a powder, containing at least one heavy rare earth element, disposed on one of the surfaces.

Referring to the Figures, wherein like numerals indicate corresponding parts throughout the several views, it is one aspect of the present invention to provide a gradient Nd—Fe—B magnet. The gradient Nd—Fe—B magnet includes an Nd—Fe—B magnet block extending along a magnetization direction and having a plurality of surfaces perpendicular to the magnetization direction. According to one embodiment of the present invention, the Nd—Fe—B magnet block can have a thickness of between 2-10 mm along the magnetization direction. According to another embodiment, the Nd—Fe—B magnet block can have a length and a width of at least 10 mm.

A first film containing at least one heavy rare earth element, disposed on one of the surfaces, attaches to the Nd—Fe—B magnet block and extends along a periphery of the one of the surfaces. A second film containing at least one heavy rare earth element, disposed on another one of the surfaces, opposite of the one of the surfaces, attaches to the Nd—Fe—B magnet block and extending along a periphery of the another one of the surfaces. The at least one heavy rare earth element is selected from a group consisting of Tb, Dy, or an alloy containing Dy or Tb. Preferably, the first film and the second film are attached and formed on the Nd—Fe—B magnet block by melting a powder containing the at least one heavy rare earth metal on the one and the another one of the surfaces and along the periphery using a laser. In other words, the first film and the second film are only formed along the periphery of the one of the surfaces and the another one of the surfaces. According to one embodiment of the present invention, the powder containing the least one heavy rare earth element is selected from a group consisting of Tb, Dy, or an alloy containing Dy or Tb and is present in the powder in an amount of 0.1 wt. % and 2 wt. %. Preferably, according to one embodiment of the present invention, the powder has an average particle size of between 1 μm and 300 μm.

The first film and the second film are diffused into the Nd—Fe—B magnet block dividing the Nd—Fe—B magnet block into an edge region, a transition region, and a central region along a plane extending perpendicular to the magnetization direction. The central portion is located at the center of the Nd—Fe—B magnet block. The transition region is located about the Nd—Fe—B magnet block. The edge region is located about the transition region. In other words, the central, transition, and edge regions of the Nd—Fe—B magnet block are disposed in a concentric relationship with one another with the central regions being disposed at the center region, the transition region extending about the center region, and the edge region extending about the transition region.

The edge region has a coercivity that remains constant in a direction perpendicular to the magnetization direction, and the coercivity of the edge region, along the magnetization direction, gradually decreases from the one of the surfaces and the another one of the surfaces towards a point located between the one of the surfaces and the another one of the surfaces. The transition region also has a coercivity that decreases toward the central portion in the direction perpendicular to the magnetization direction and the coercivity of the transition region, along the magnetization direction, gradually decreases from the one of the surfaces and the another one of the surfaces to the point between the one of the surfaces and the another one of the surfaces. The center region has a coercivity that remains constant in the direction perpendicular to the magnetization direction and along the magnetization direction. It should be appreciated that an average of the coercivity of the edge region is greater than an average of the coercivity of the transition region and the average of the coercivity of the transition region is greater than an average of the coercivity of the central region. In other words, by diffusing the first film and the second film into the periphery of the Nd—Fe—B magnet block improves the coercivity of the edge portion of the Nd—Fe—B thereby improves the de-magnetization resistance of the Nd—Fe—B magnet.

It is another aspect of the present invention to provide a method of making the gradient Nd—Fe—B magnet. The method includes a first step of providing an Nd—Fe—B magnet block having a plurality of surfaces that are perpendicular to a magnetization direction. According to one embodiment of the present invention, the Nd—Fe—B magnet block can have a thickness of between 2-10 mm along the magnetization direction. According to another embodiment, the Nd—Fe—B magnet block can have a length and a width of at least 10 mm. The method then proceeds with placing the Nd—Fe—B magnet block in a chamber containing an inert gas of argon with the magnetization direction of the Nd—Fe—B magnet block being arranged in a vertical direction. The next step of the method includes depositing a powder, containing at least one heavy rare earth element, on the one of the surfaces. According to one embodiment of the present invention, the powder containing the least one heavy rare earth element is selected from a group consisting of Tb, Dy, or an alloy containing Dy or Tb and the powder is present in an amount of 0.1 wt. % and 2 wt. % of the Nd—Fe—B magnet block. Preferably, according to one embodiment of the present invention, the powder has an average particle size of between 1 μm and 300 μm.

Then, the method follows with a step of forming the first film containing the at least one heavy rare earth element on the one of the surfaces and along the periphery of the one of the surfaces. The step of forming the first film further includes a step of melting the powder on the one of the surfaces and along the periphery using a laser to form the first film and adhering the first film to the periphery. Preferably, an area covered by the first film is 10% to 65% of an area covered by the powder on one of the surfaces of the Nd—Fe—B magnet block. Next, excess powder are removed from the one of the surfaces. In other words, the powder of the heavy rare earth elements only forms the first film along the periphery of the one of the surfaces. This significantly reduces the amount of heavy rare earth elements used during the manufacturing process. After removing the excess powder, the Nd—Fe—B magnet block is rotated 180°.

After rotating the magnet block, the powder, containing at least one heavy rare earth element, is deposited on the another one of the surfaces opposite of the one of the surfaces. Then, the method proceeds with forming the second film containing the at least one heavy rare earth element on the another one of the surfaces and along the periphery of the another one of the surfaces. The step of forming the second film further including a step of melting the powder on the another one of the surfaces and along the periphery using a laser to form the second film and adhering the second film to the periphery. Preferably, an area covered by the second film is 10% to 65% of an area covered by the powder on the another one of the surfaces of the Nd—Fe—B magnet block. Next, the excess powder is removed from the another one of the surfaces. Similar to the first film, the powder of the heavy rare earth elements only forms the second film along the periphery of the another one of the surfaces. This also significantly reduces the amount of heavy rare earth elements used during the manufacturing process. Then, the first film and the second film are diffused into the Nd—Fe—B magnet block under a vacuum environment or an inert environment containing argon and at a predetermined temperature. The step of diffusing is further defined as heating the Nd—Fe—B magnet block including the first film and the second film at the predetermined temperature of between 850° C. and 950° C. at a diffusing time of between 6 hours and 72 hours. The diffusing further includes a step of aging the Nd—Fe—B magnet block including the first film and the second film at an aging temperature of between 450° C. and 650° C. at an aging time of between 3 hours and 15 hours.

The examples below provide a better illustration of the present invention. The examples are used for illustrative purposes only and do not limit the scope of the present invention.

Implementing Example 1

Figure 2:
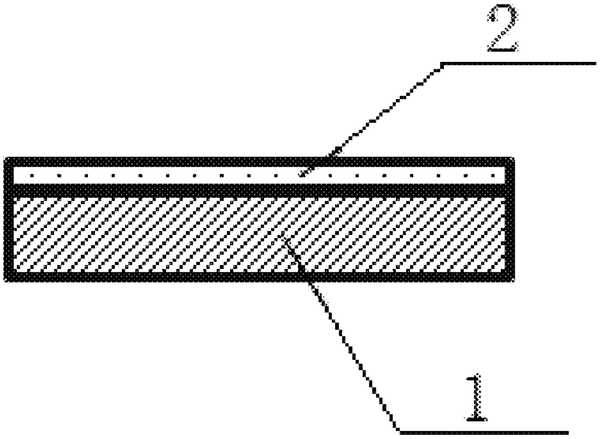
FIG. 2 is a cross-sectional side view of the Nd—Fe—B magnet block of FIG. 1 along the lines 2-2.
Figure 3:
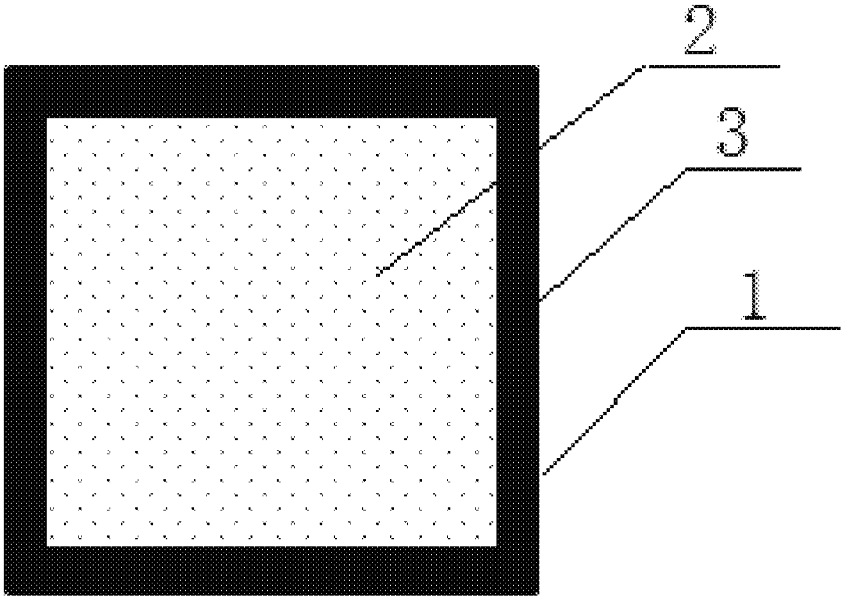
FIG. 3 is a top view of the Nd—Fe—B magnet block including the powder and a first film disposed on the one of the surfaces.
Figure 4:
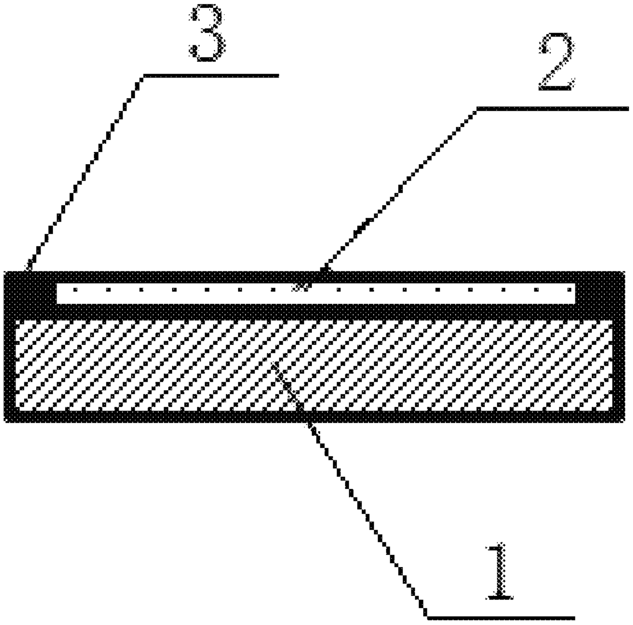
FIG. 4 is a cross-sectional side view of the Nd—Fe—B magnet block of FIG. 3 along the lines 4-4.
Figure 5:
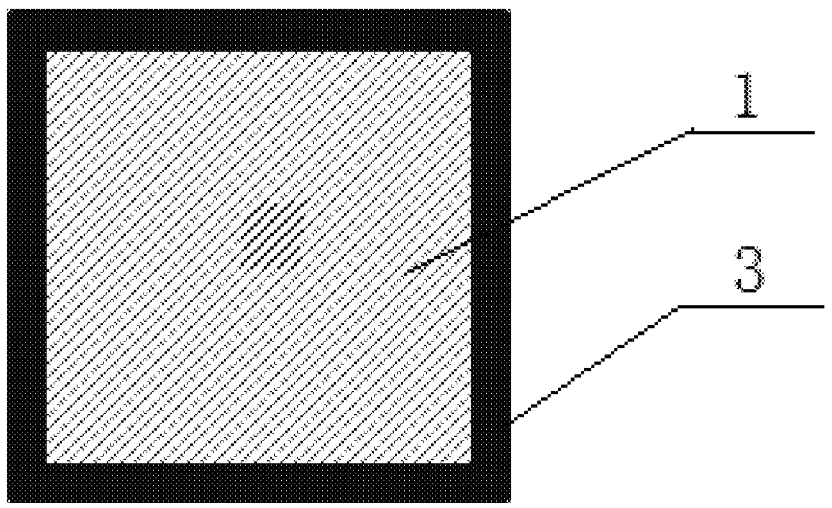
FIG. 5 is a top view of the Nd—Fe—B magnet block including the first film disposed on the one of the surfaces.
Figure 6:
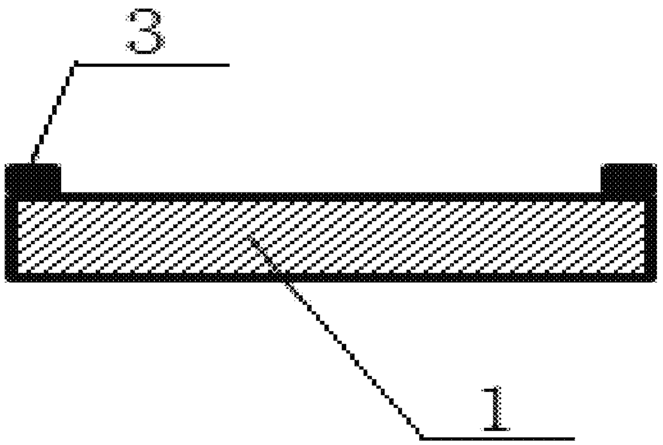
FIG. 6 is a cross-sectional side view of the Nd—Fe—B magnet block of FIG. 5 along the lines 6-6.
Figure 7:
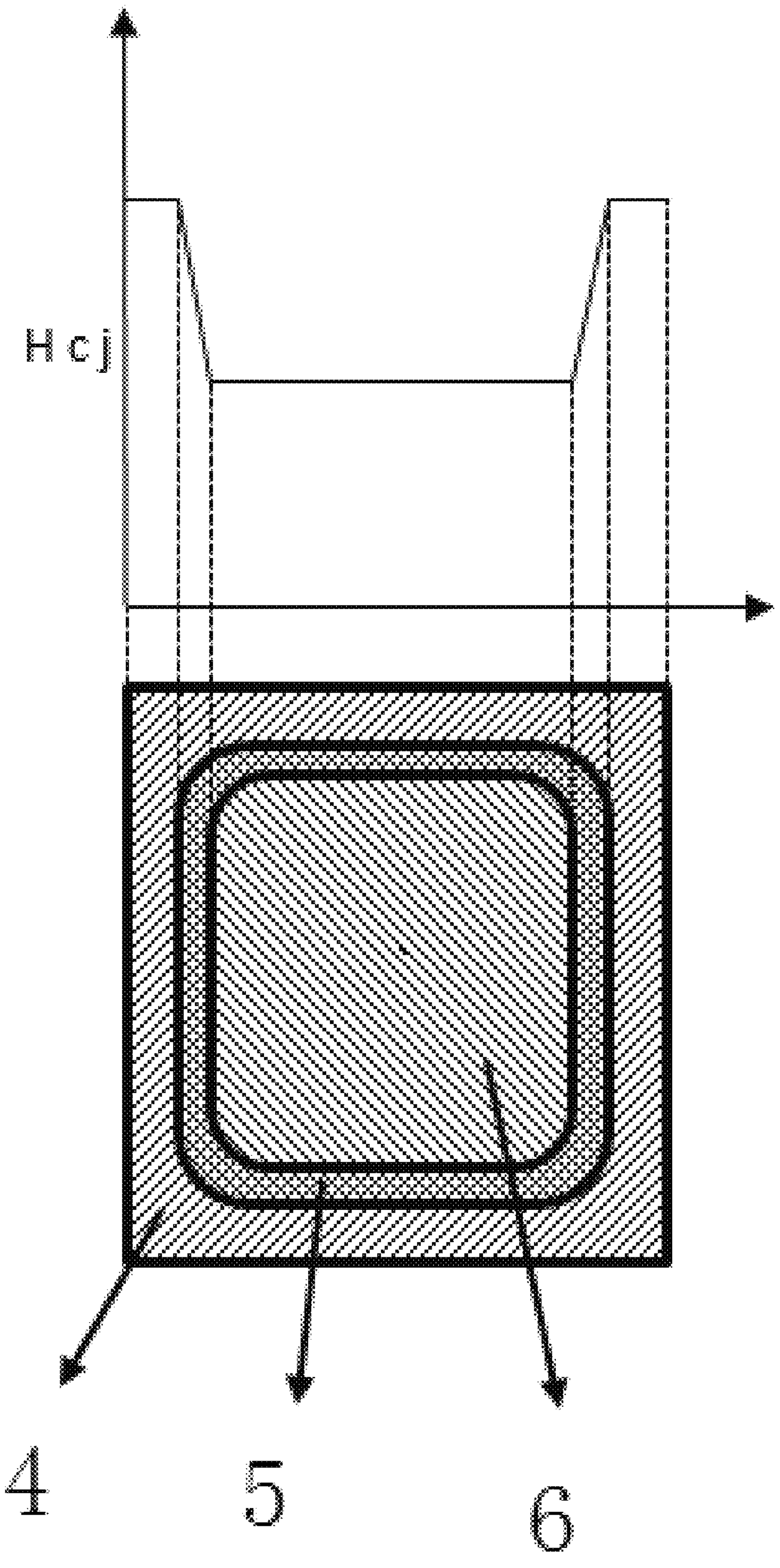
FIG. 7 a cross-sectional view of a gradient Nd—Fe—B magnet block taken perpendicular to a magnetization direction and illustrates coercive force distribution of the gradient Nd—Fe—B magnet segment according to one embodiment of the present invention.
Figure 8:
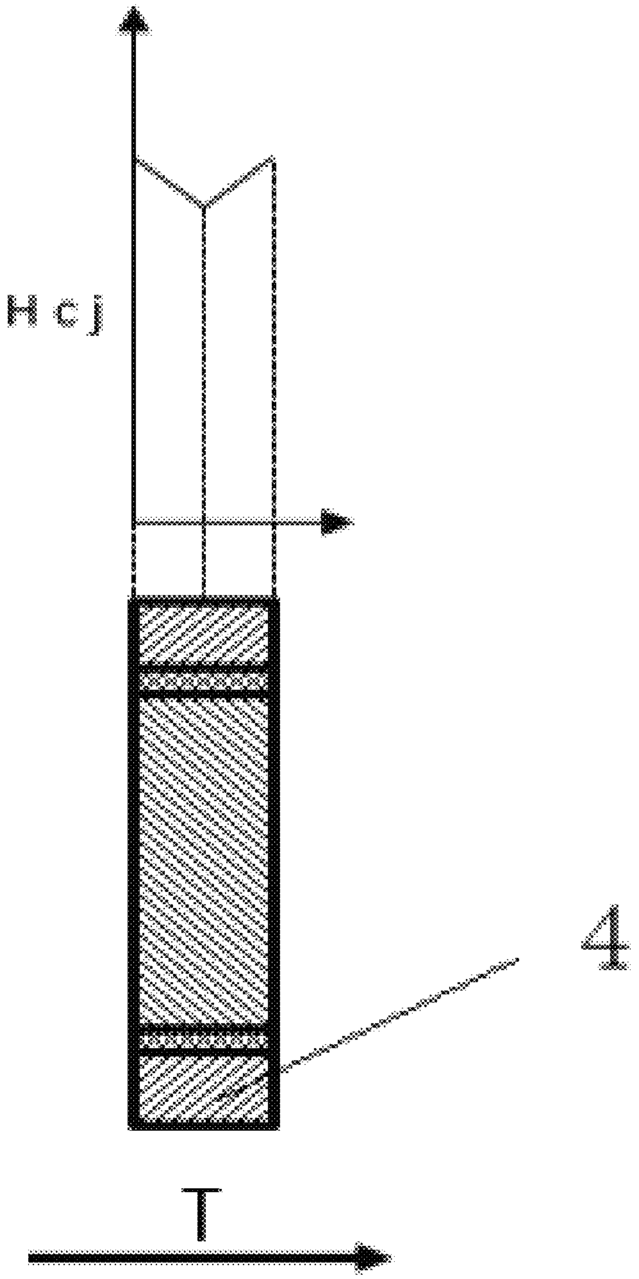
FIG. 8 is a cross-sectional view of a gradient Nd—Fe—B magnet block taken at a center in the magnetization direction and illustrates coercive force distribution of an edge region of the gradient Nd—Fe—B magnet segment according to one embodiment of the present invention.
Figure 9:
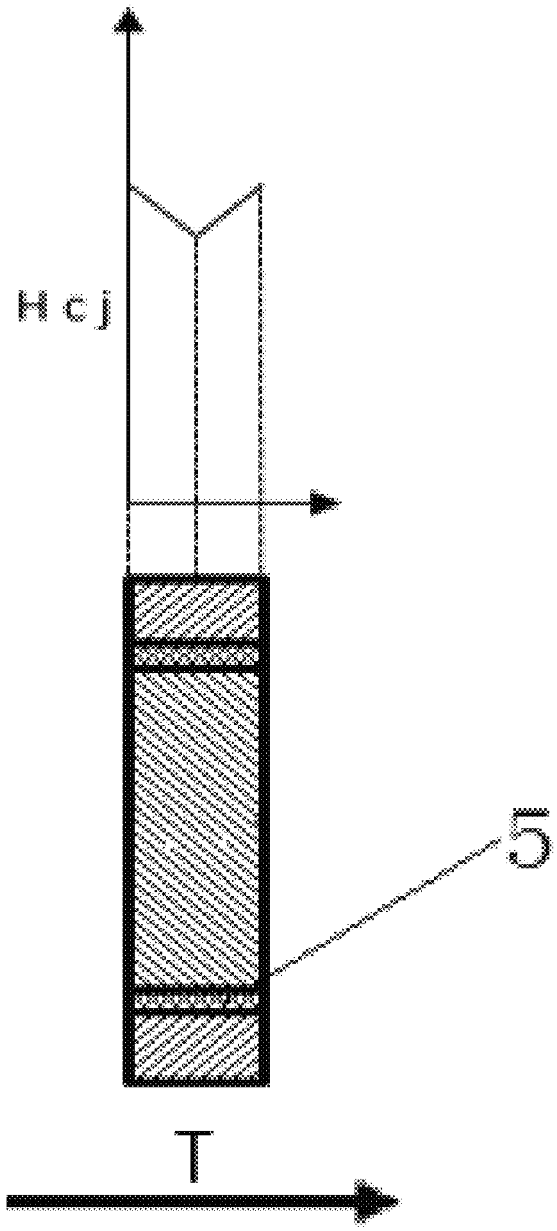
FIG. 9 is a cross-sectional view of a gradient Nd—Fe—B magnet block taken at a center in the magnetization direction and illustrates coercive force distribution of a transition region of the gradient Nd—Fe—B magnet segment according to one embodiment of the present invention.
Figure 10:
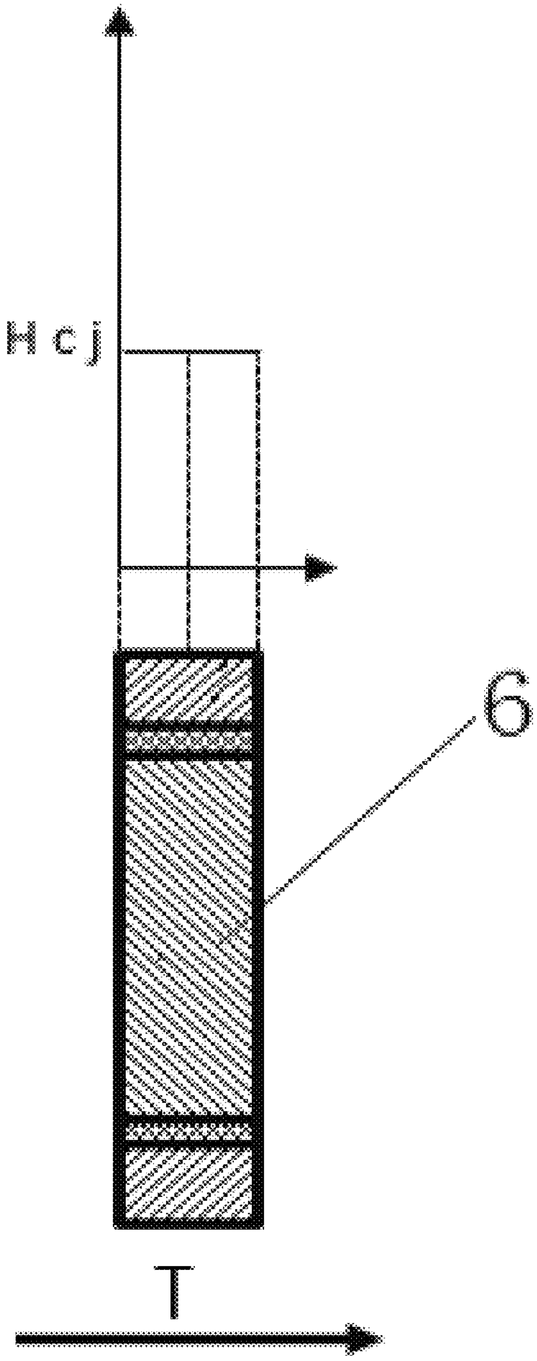
FIG. 10 is a cross-sectional view of a gradient Nd—Fe—B magnet block taken at a center in the magnetization direction and illustrates coercive force distribution of a central region of the gradient Nd—Fe—B magnet segment according to one embodiment of the present invention.
Figure 11:
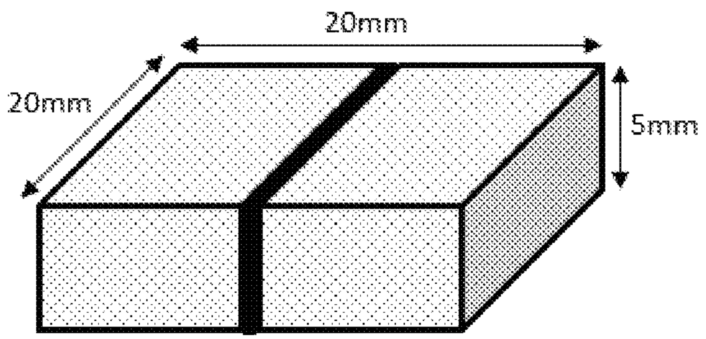
FIG. 11 is a perspective view of a gradient Nd—Fe—B magnet having a dimension of 20 mm*20 mm*5 mm prepared according to one embodiment of the present invention.

In implementing example 1, a plurality of Nd—Fe—B magnet blocks 1, each having a dimension of 20 mm*20 mm*5 mm are provided. Each of the Nd—Fe—B magnet blocks 1 has a plurality of surfaces that are perpendicular to a magnetization direction. Each of the Nd—Fe—B magnet blocks 1 are then placed in a chamber containing an inert gas of argon with the magnetization direction of the Nd—Fe—B magnet block 1 being arranged in a vertical direction. Then, as best illustrated in FIGS. 1 and 2, a powder 2, containing at least one heavy rare earth element of Tb and having an average particle size of Sum, is disposed on the one of the surfaces. The heavy rare earth element is 0.5 wt. % of the total mass of the Nd—Fe—B magnet block. Next, a first film 3, as best illustrated in FIGS. 3 and 4, containing the at least one heavy rare earth element of Tb, is formed on the one of the surfaces and along the periphery of the one of the surfaces. More specifically, the Nd—Fe—B magnet block containing the heavy rare earth element is move under a laser wherein the laser melts the powder 1, in a strip extending approximately 2 mm along the periphery of the one of the surfaces, to form the first film and adhering the first film to the periphery. The area covered by the first film is approximately 36% the area covered by the powder on one of the surfaces of the Nd—Fe—B magnet block. As best shown in FIGS. 5 and 6, excess powder are then removed from the one of the surfaces. The Nd—Fe—B magnet block is rotated 180°.

After rotating the Nd—Fe—B magnet block, the powder 1, containing at least one heavy rare earth element of Tb, is deposited on the another one of the surfaces opposite of the one of the surfaces. A second film containing the at least one heavy rare earth element of Tb is formed on the another one of the surfaces and along the periphery of the another one of the surfaces. In particular, the Nd—Fe—B magnet block containing the heavy rare earth element is move under a laser wherein the laser melts the powder, in a strip extending approximately 2 mm along the periphery of the another one of the surfaces, to form the second film and adhering the second film to the periphery. Excess powder are then removed from the another one of the surfaces.

Then, the first film and the second film are diffused into the Nd—Fe—B magnet block under a vacuum environment and at a predetermined temperature. In particular, the Nd—Fe—B magnet block including the first film and the second film is heated at the predetermined temperature of between 900° C. at a diffusing time of 24 hours. Then, the Nd—Fe—B magnet block including the first film and the second film is subjected to an aging treatment at an aging temperature of between 500° C. at an aging time of 6 hours.

After diffusing the Nd—Fe—B magnet block, the gradient Nd—Fe—B magnet is formed and includes an edge region 4, a transition region 5, and a central region 6 along a plane extending perpendicular to the magnetization direction. The edge region 4 has a coercivity that remains constant in a direction perpendicular to the magnetization direction, and the coercivity of the edge region 4, along the magnetization direction, gradually decreases from the one of the surfaces and the another one of the surfaces towards a point located between the one of the surfaces and the another one of the surfaces. The transition region 5 also has a coercivity that decreases toward the central portion 6 in the direction perpendicular to the magnetization direction and the coercivity of the transition region 5, along the magnetization direction, gradually decreases from the one of the surfaces and the another one of the surfaces to the point located between the one of the surfaces and the another one of the surfaces. The center region 6 has a coercivity that remains constant in the direction perpendicular to the magnetization direction and along the magnetization direction. An average of the coercivity of the edge region 4 is greater than an average of the coercivity of the transition region 5 and the average of the coercivity of the transition region 6 is greater than an average of the coercivity of the central region 6.

Figure 12:
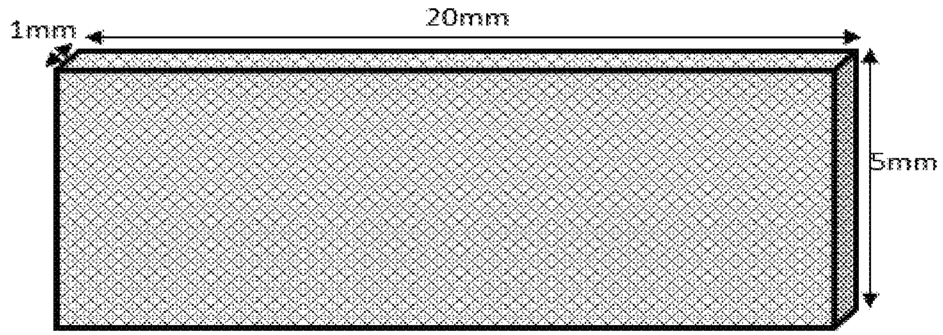
FIG. 12 is a perspective view of a gradient Nd—Fe—B magnet having a dimension of 20 mm*1 mm*5 mm according to one embodiment of the present invention.
Figure 13:
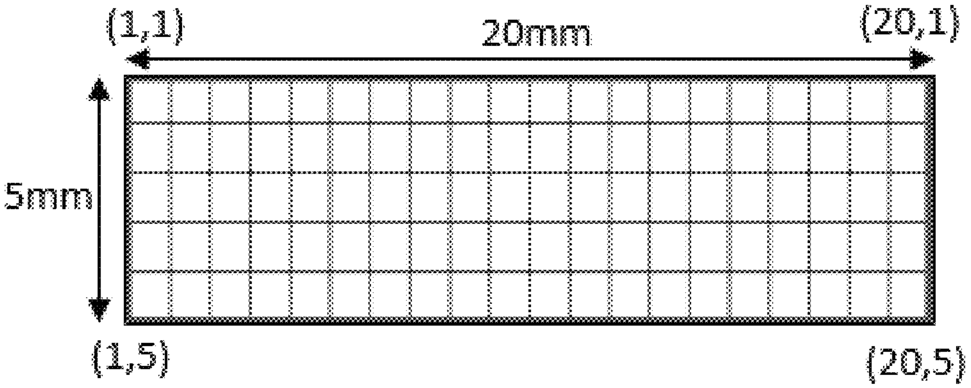
FIG. 13 is a top view of the gradient Nd—Fe—B magnet of FIG. 2 including a plurality of lines for cutting the Nd—Fe—B magnet into small 1 mm*1 mm*1 mm Nd—Fe—B magnets.

After forming the gradient Nd—Fe—B magnet, the gradient magnet is sliced along the in the length or width direction forming a plurality of 20 mm*1 mmm*5 mm Nd—Fe—B magnets as best illustrated in FIG. 12. Then, the Nd—Fe—B magnets are further sliced into small Nd—Fe—B magnets having a dimension of 1 mm*1 mm*1 mm as best shown in FIG. 13. It should be noted that the Nd—Fe—B magnet located in the first row and the first column of FIG. 13 is referred to as "1, 1." The Nd—Fe—B magnet located in the second row and the first column of FIG. 13 is referred to as "2, 1." The Nd—Fe—B magnet located in the third row and the third column of FIG. 13 is referred to as "3, 3." Properties of the small Nd—Fe—B magnets are then tested wherein portions of the properties are listed in Table 1 below. In addition, based on the data obtained the relationship between the coercivity and different parts of the gradient magnets are mapped and illustrated in FIGS. 7-10.

Implementing Example 2

In implementing example 2, a plurality of Nd—Fe—B magnet blocks, each having a dimension of 40 mm*40 mm*10 mm are provided. Each of the Nd—Fe—B magnet blocks has a plurality of surfaces that are perpendicular to a magnetization direction. Each of the Nd—Fe—B magnet blocks are then placed in a chamber containing an inert gas of argon with the magnetization direction of the Nd—Fe—B magnet block being arranged in a vertical direction. Then, a powder, containing at least one heavy rare earth element of Tb and having an average particle size of 100 μm, is disposed on the one of the surfaces. The heavy rare earth element is 2.0 wt. % of the total mass of the Nd—Fe—B magnet block. Next, a first film, containing the at least one heavy rare earth element of Tb, is formed on the one of the surfaces and along the periphery of the one of the surfaces. More specifically, the Nd—Fe—B magnet block containing the heavy rare earth element is move under a laser wherein the laser melts the powder, in a strip extending approximately 3 mm along the periphery of the one of the surfaces, to form the first film and adhering the first film to the periphery. The area covered by the first film is approximately 28% the area covered by the powder on one of the surfaces of the Nd—Fe—B magnet block. Excess powder are then removed from the one of the surfaces. The Nd—Fe—B magnet block is rotated 180°.

After rotating the magnet block, the powder, containing at least one heavy rare earth element of Tb, is deposited on the another one of the surfaces opposite of the one of the surfaces. A second film containing the at least one heavy rare earth element of Tb is formed on the another one of the surfaces and along the periphery of the another one of the surfaces. In particular, the Nd—Fe—B magnet block containing the heavy rare earth element is move under a laser wherein the laser melts the powder, in a strip extending approximately 3 mm along the periphery of the another one of the surfaces, to form the second film and adhering the second film to the periphery. Excess powder are then removed from the another one of the surfaces.

Then, the first film and the second film are diffused into the Nd—Fe—B magnet block under a vacuum environment and at a predetermined temperature. In particular, the Nd—Fe—B magnet block including the first film and the second film is heated at the predetermined temperature of between 850° C. at a diffusing time of 72 hours. Then, the Nd—Fe—B magnet block including the first film and the second film is subjected to an aging treatment at an aging temperature of between 500° C. at an aging time of 15 hours.

After diffusing the Nd—Fe—B magnet block, the gradient Nd—Fe—B magnet is formed and includes an edge region, a transition region, and a central region along a plane extending perpendicular to the magnetization direction. The edge region has a coercivity that remains constant in a direction perpendicular to the magnetization direction, and the coercivity of the edge region, along the magnetization direction, gradually decreases from the one of the surfaces and the another one of the surfaces towards a point located between the one of the surfaces and the another one of the surfaces. The transition region also has a coercivity that decreases toward the central portion in the direction perpendicular to the magnetization direction and the coercivity of the transition region, along the magnetization direction, gradually decreases from the one of the surfaces and the another one of the surfaces to the point between the one of the surfaces and the another one of the surfaces. The center region has a coercivity that remains constant in the direction perpendicular to the magnetization direction and along the magnetization direction. An average of the coercivity of the edge region is greater than an average of the coercivity of the transition region and the average of the coercivity of the transition region is greater than an average of the coercivity of the central region.

After forming the gradient Nd—Fe—B magnet, the gradient magnet is sliced along the in the length or width direction forming a plurality of 40 mm*1 mmm*10 mm Nd—Fe—B magnets. Then, the Nd—Fe—B magnets are further sliced into small Nd—Fe—B magnets having a dimension of 1 mm*1 mm*1 mm. It should be noted that the Nd—Fe—B magnet located in the first row and the first column is referred to as "1, 1." The Nd—Fe—B magnet located in the second row and the first column is referred to as "2, 1." The Nd—Fe—B magnet located in the third row and the third column is referred to as "3, 3." Properties of the small Nd—Fe—B magnets are then tested wherein portions of the properties are listed in Table 1 below.

Implementing Example 3

In implementing example 3, a plurality of Nd—Fe—B magnet blocks, each having a dimension of 80 mm*50 mm*5 mm are provided. Each of the Nd—Fe—B magnet blocks has a plurality of surfaces that are perpendicular to a magnetization direction. Each of the Nd—Fe—B magnet blocks are then placed in a chamber containing an inert gas of argon with the magnetization direction of the Nd—Fe—B magnet block being arranged in a vertical direction. Then, a powder, containing at least one heavy rare earth element of Dy and having an average particle size of 200 μm, is disposed on the one of the surfaces. The heavy rare earth element is 0.5 wt. % of the total mass of the Nd—Fe—B magnet block. Next, a first film, containing the at least one heavy rare earth element of Dy, is formed on the one of the surfaces and along the periphery of the one of the surfaces. More specifically, the Nd—Fe—B magnet block containing the heavy rare earth element is move under a laser wherein the laser melts the powder, in a strip extending approximately 2 mm along the periphery of the one of the surfaces, to form the first film and adhering the first film to the periphery. The area covered by the first film is approximately 24% the area covered by the powder on one of the surfaces of the Nd—Fe—B magnet block. Excess powder are then removed from the one of the surfaces. The Nd—Fe—B magnet block is rotated 180°.

After rotating the magnet block, the powder, containing at least one heavy rare earth element of Dy, is deposited on the another one of the surfaces opposite of the one of the surfaces. A second film containing the at least one heavy rare earth element of Dy is formed on the another one of the surfaces and along the periphery of the another one of the surfaces. In particular, the Nd—Fe—B magnet block containing the heavy rare earth element is move under a laser wherein the laser melts the powder, in a strip extending approximately 2 mm along the periphery of the another one of the surfaces, to form the second film and adhering the second film to the periphery. Excess powder are then removed from the another one of the surfaces.

Then, the first film and the second film are diffused into the Nd—Fe—B magnet block under a vacuum environment and at a predetermined temperature. In particular, the Nd—Fe—B magnet block including the first film and the second film is heated at the predetermined temperature of between 950° C. at a diffusing time of 6 hours. Then, the Nd—Fe—B magnet block including the first film and the second film is subjected to an aging treatment at an aging temperature of between 450° C. at an aging time of 8 hours.

After diffusing the Nd—Fe—B magnet block, the gradient Nd—Fe—B magnet is formed and includes an edge region, a transition region, and a central region along a plane extending perpendicular to the magnetization direction. The edge region has a coercivity that remains constant in a direction perpendicular to the magnetization direction, and the coercivity of the edge region, along the magnetization direction, gradually decreases from the one of the surfaces and the another one of the surfaces towards a point located between the one of the surfaces and the another one of the surfaces. The transition region also has a coercivity that decreases toward the central portion in the direction perpendicular to the magnetization direction and the coercivity of the transition region, along the magnetization direction, gradually decreases from the one of the surfaces and the another one of the surfaces to the point between the one of the surfaces and the another one of the surfaces. The center region has a coercivity that remains constant in the direction perpendicular to the magnetization direction and along the magnetization direction. An average of the coercivity of the edge region is greater than an average of the coercivity of the transition region and the average of the coercivity of the transition region is greater than an average of the coercivity of the central region.

After forming the gradient Nd—Fe—B magnet, the gradient magnet is sliced along the in the length or width direction forming a plurality of 20 mm*1 mmm*5 mm Nd—Fe—B magnets. Then, the Nd—Fe—B magnets are further sliced into small Nd—Fe—B magnets having a dimension of 1 mm*1 mm*1 mm. It should be noted that the Nd—Fe—B magnet located in the first row and the first column is referred to as "1, 1." The Nd—Fe—B magnet located in the second row and the first column is referred to as "2, 1." The Nd—Fe—B magnet located in the third row and the third column is referred to as "3, 3." Properties of the small Nd—Fe—B magnets are then tested wherein portions of the properties are listed in Table 1 below.

Implementing Example 4

In implementing example 4, a plurality of Nd—Fe—B magnet blocks, each having a dimension of 80 mm*80 mm*5 mm are provided. Each of the Nd—Fe—B magnet blocks has a plurality of surfaces that are perpendicular to a magnetization direction. Each of the Nd—Fe—B magnet blocks are then placed in a chamber containing an inert gas of argon with the magnetization direction of the Nd—Fe—B magnet block being arranged in a vertical direction. Then, a powder, containing at least one heavy rare earth element of Dy and having an average particle size of 250 μm, is disposed on the one of the surfaces. The powder is an alloy powder containing Tb and Co wherein Tb is present at 90 wt. %). The powder is 0.5% of the mass of the Nd—Fe—B magnet block. Next, a first film, containing the at least one heavy rare earth element of Tb, is formed on the one of the surfaces and along the periphery of the one of the surfaces. More specifically, the Nd—Fe—B magnet block containing the heavy rare earth element is move under a laser wherein the laser melts the powder, in a strip extending approximately 2 mm along the periphery of the one of the surfaces, to form the first film and adhering the first film to the periphery. The area covered by the first film is approximately 10% the area covered by the powder on one of the surfaces of the Nd—Fe—B magnet block. Excess powder are then removed from the one of the surfaces. The Nd—Fe—B magnet block is rotated 180°.

After rotating the magnet block, the powder, containing at least one heavy rare earth element of Tb, is deposited on the another one of the surfaces opposite of the one of the surfaces. A second film containing the at least one heavy rare earth element of Tb is formed on the another one of the surfaces and along the periphery of the another one of the surfaces. In particular, the Nd—Fe—B magnet block containing the heavy rare earth element is move under a laser wherein the laser melts the powder, in a strip extending approximately 2 mm along the periphery of the another one of the surfaces, to form the second film and adhering the second film to the periphery. Excess powder are then removed from the another one of the surfaces.

Then, the first film and the second film are diffused into the Nd—Fe—B magnet block under a vacuum environment and at a predetermined temperature. In particular, the Nd—Fe—B magnet block including the first film and the second film is heated at the predetermined temperature of between 900° C. at a diffusing time of 24 hours. Then, the Nd—Fe—B magnet block including the first film and the second film is subjected to an aging treatment at an aging temperature of between 650° C. at an aging time of 6 hours.

After diffusing the Nd—Fe—B magnet block, the gradient Nd—Fe—B magnet is formed and includes an edge region, a transition region, and a central region along a plane extending perpendicular to the magnetization direction. The edge region has a coercivity that remains constant in a direction perpendicular to the magnetization direction, and the coercivity of the edge region, along the magnetization direction, gradually decreases from the one of the surfaces and the another one of the surfaces towards a point located between the one of the surfaces and the another one of the surfaces. The transition region also has a coercivity that decreases toward the central portion in the direction perpendicular to the magnetization direction and the coercivity of the transition region, along the magnetization direction, gradually decreases from the one of the surfaces and the another one of the surfaces to the point between the one of the surfaces and the another one of the surfaces. The center region has a coercivity that remains constant in the direction perpendicular to the magnetization direction and along the magnetization direction. An average of the coercivity of the edge region is greater than an average of the coercivity of the transition region and the average of the coercivity of the transition region is greater than an average of the coercivity of the central region.

After forming the gradient Nd—Fe—B magnet, the gradient magnet is sliced along the in the length or width direction forming a plurality of 80 mm*1 mmm*5 mm Nd—Fe—B magnets. Then, the Nd—Fe—B magnets are further sliced into small Nd—Fe—B magnets having a dimension of 1 mm*1 mm*1 mm. It should be noted that the Nd—Fe—B magnet located in the first row and the first column is referred to as "1, 1." The Nd—Fe—B magnet located in the second row and the first column is referred to as "2, 1." The Nd—Fe—B magnet located in the third row and the third column is referred to as "3, 3." Properties of the small Nd—Fe—B magnets are then tested wherein portions of the properties are listed in Table 1 below.

Implementing Example 5

In implementing example 5, a plurality of Nd—Fe—B magnet blocks, each having a dimension of 10 mm*10 mm*2 mm are provided. Each of the Nd—Fe—B magnet blocks has a plurality of surfaces that are perpendicular to a magnetization direction. Each of the Nd—Fe—B magnet blocks are then placed in a chamber containing an inert gas of argon with the magnetization direction of the Nd—Fe—B magnet block being arranged in a vertical direction. Then, a powder, containing at least one heavy rare earth element of Tb and having an average particle size of 10 μm, is disposed on the one of the surfaces. The powder is a hydrogenated Tb powder wherein the powder is 0.1% of the mass of the Nd—Fe—B magnet blocks. Next, a first film, containing the at least one heavy rare earth element of Tb, is formed on the one of the surfaces and along the periphery of the one of the surfaces. More specifically, the Nd—Fe—B magnet block containing the heavy rare earth element is move under a laser wherein the laser melts the powder, in a strip extending approximately 2 mm along the periphery of the one of the surfaces, to form the first film and adhering the first film to the periphery. The area covered by the first film is approximately 64% the area covered by the powder on one of the surfaces of the Nd—Fe—B magnet block. Excess powder are then removed from the one of the surfaces. The Nd—Fe—B magnet block is rotated 180°.

After rotating the magnet block, the powder, containing at least one heavy rare earth element of Tb, is deposited on the another one of the surfaces opposite of the one of the surfaces. A second film containing the at least one heavy rare earth element of Tb is formed on the another one of the surfaces and along the periphery of the another one of the surfaces. In particular, the Nd—Fe—B magnet block containing the heavy rare earth element is move under a laser wherein the laser melts the powder, in a strip extending approximately 2 mm along the periphery of the another one of the surfaces, to form the second film and adhering the second film to the periphery. Excess powder are then removed from the another one of the surfaces.

Then, the first film and the second film are diffused into the Nd—Fe—B magnet block under a vacuum environment and at a predetermined temperature. In particular, the Nd—Fe—B magnet block including the first film and the second film is heated at the predetermined temperature of between 900° C. at a diffusing time of 6 hours. Then, the Nd—Fe—B magnet block including the first film and the second film is subjected to an aging treatment at an aging temperature of between 650° C. at an aging time of 3 hours.

After diffusing the Nd—Fe—B magnet block, the gradient Nd—Fe—B magnet is formed and includes an edge region, a transition region, and a central region along a plane extending perpendicular to the magnetization direction. The edge region has a coercivity that remains constant in a direction perpendicular to the magnetization direction, and the coercivity of the edge region, along the magnetization direction, gradually decreases from the one of the surfaces and the another one of the surfaces towards a point located between the one of the surfaces and the another one of the surfaces. The transition region also has a coercivity that decreases toward the central portion in the direction perpendicular to the magnetization direction and the coercivity of the transition region, along the magnetization direction, gradually decreases from the one of the surfaces and the another one of the surfaces to the point between the one of the surfaces and the another one of the surfaces. The center region has a coercivity that remains constant in the direction perpendicular to the magnetization direction and along the magnetization direction. An average of the coercivity of the edge region is greater than an average of the coercivity of the transition region and the average of the coercivity of the transition region is greater than an average of the coercivity of the central region.

Comparative Example 1

In comparative example 1, a plurality of Nd—Fe—B magnet blocks, each having a dimension of 20 mm*20 mm*5 mm are provided. More specifically, the Nd—Fe—B magnet blocks are provided using the saw raw powder as the Nd—Fe—B magnets from Implementing Example 5. The Nd—Fe—B magnet blocks are then sliced along the in the length or width direction forming a plurality of 20 mm*1 mmm*5 mm Nd—Fe—B magnets. Then, the Nd—Fe—B magnets are further sliced into small Nd—Fe—B magnets having a dimension of 1 mm*1 mm*1 mm. It should be noted that the Nd—Fe—B magnet located in the first row and the first column is referred to as "1, 1." The Nd—Fe—B magnet located in the second row and the first column is referred to as "2, 1." The Nd—Fe—B magnet located in the third row and the third column is referred to as "3, 3." Properties of the small Nd—Fe—B magnets are then tested wherein portions of the properties are listed in Table 1 below.

TABLE 1

Magnetic Properties of the Gradient Magnet of Implementing Examples 1-4 and Magnetic Properties of the Magnets of Comparative Example 1

| | | | | | | | | | | | |
|---|---|---|---|---|---|---|---|---|---|---|---|
| Comparative Example | Sample No. | (1, 1) | | (1, 5) | | (1, 10) | | (1, 15) | | (1, 20) | |
| | Coercivity | Br | Hcj | Br | Hcj | Br | Hcj | Br | Hcj | Br | Hcj |
| | | 13.8 | 18.9 | 13.79 | 18.9 | 13.8 | 18.9 | 13.79 | 18.9 | 13.8 | 18.89 |
| | Sample No. | (3, 1) | | (3, 5) | | (3, 10) | | (3, 15) | | (3, 20) | |
| | Coercivity | Br | Hcj | Br | Hcj | Br | Hcj | Br | Hcj | Br | Hcj |
| | | 13.79 | 18.9 | 13.8 | 18.9 | 13.8 | 18.9 | 13.8 | 18.9 | 13.79 | 18.9 |
| | Sample No. | (5, 1) | | (5, 5) | | (5, 10) | | (5, 15) | | (5, 20) | |
| | Coercivity | Br | Hcj | Br | Hcj | Br | Hcj | Br | Hcj | Br | Hcj |
| | | 13.79 | 18.9 | 13.8 | 18.89 | 13.8 | 18.9 | 13.79 | 18.89 | 13.79 | 18.89 |
| Implementing Example 1 | Sample No. | (1, 1) | | (1, 2) | | (1, 3) | | (1, 6) | | (1, 8) | |
| | Coercivity | Br | Hcj | Br | Hcj | Br | Hcj | Br | Hcj | Br | Hcj |
| | | 13.62 | 29.6 | 13.61 | 29.55 | 13.66 | 27.2 | 13.79 | 18.9 | 13.8 | 18.89 |
| | Sample No. | (3, 1) | | (3, 2) | | (3, 3) | | (3, 6) | | (3, 8) | |
| | Coercivity | Br | Hcj | Br | Hcj | Br | Hcj | Br | Hcj | Br | Hcj |
| | | 13.7 | 26.4 | 13.71 | 26.4 | 13.75 | 23.7 | 13.8 | 18.88 | 13.8 | 18.88 |
| | Sample No. | (5, 1) | | (5, 2) | | (5, 3) | | (5, 6) | | (5, 8) | |
| | Coercivity | Br | Hcj | Br | Hcj | Br | Hcj | Br | Hcj | Br | Hcj |
| | | 13.61 | 29.58 | 13.6 | 29.6 | 13.65 | 27.3 | 13.79 | 18.89 | 13.8 | 18.89 |
| Implementing Example 2 | Sample No. | (1, 1) | | (1, 3) | | (1, 4) | | (1, 8) | | (1, 10) | |
| | Coercivity | Br | Hcj | Br | Hcj | Br | Hcj | Br | Hcj | Br | Hcj |
| | | 13.59 | 29.58 | 13.6 | 29.55 | 13.65 | 28.1 | 13.79 | 18.88 | 13.8 | 18.9 |
| | Sample No. | (5, 1) | | (5, 3) | | (5, 4) | | (5, 8) | | (5, 10) | |
| | Coercivity | Br | Hcj | Br | Hcj | Br | Hcj | Br | Hcj | Br | Hcj |
| | | 13.71 | 26.42 | 13.73 | 26.38 | 13.76 | 24.2 | 13.8 | 18.89 | 13.79 | 18.89 |
| | Sample No. | (10, 1) | | (10, 3) | | (10, 4) | | (10, 8) | | (10, 10) | |
| | Coercivity | Br | Hcj | Br | Hcj | Br | Hcj | Br | Hcj | Br | Hcj |
| | | 13.6 | 29.57 | 13.61 | 29.58 | 13.66 | 28.2 | 13.79 | 18.9 | 13.8 | 18.88 |
| Implementing Example 3 | Sample No. | (1, 1) | | (1, 2) | | (1, 3) | | (1, 6) | | (1, 8) | |
| | Coercivity | Br | Hcj | Br | Hcj | Br | Hcj | Br | Hcj | Br | Hcj |
| | | 13.63 | 25.68 | 13.61 | 25.68 | 13.67 | 23.11 | 13.78 | 18.9 | 13.8 | 18.89 |
| | Sample No. | (3, 1) | | (3, 2) | | (3, 3) | | (3, 6) | | (3, 8) | |
| | Coercivity | Br | Hcj | Br | Hcj | Br | Hcj | Br | Hcj | Br | Hcj |
| | | 13.71 | 22.21 | 13.72 | 22.2 | 13.76 | 21.2 | 13.8 | 18.9 | 13.79 | 18.89 |
| | Sample No. | (5, 1) | | (5, 2) | | (5, 3) | | (5, 6) | | (5, 8) | |
| | Coercivity | Br | Hcj | Br | Hcj | Br | Hcj | Br | Hcj | Br | Hcj |
| | | 13.62 | 25.65 | 13.61 | 25.62 | 13.66 | 13.14 | 13.78 | 18.9 | 13.8 | 18.89 |
| Implementing Example 4 | Sample No. | (1, 1) | | (1, 2) | | (1, 3) | | (1, 6) | | (1, 8) | |
| | Coercivity | Br | Hcj | Br | Hcj | Br | Hcj | Br | Hcj | Br | Hcj |
| | | 13.6 | 29.62 | 13.61 | 29.61 | 13.66 | 27.6 | 13.79 | 18.9 | 13.8 | 18.89 |
| | Sample No. | (3, 1) | | (3, 2) | | (3, 3) | | (3, 6) | | (3, 8) | |
| | Coercivity | Br | Hcj | Br | Hcj | Br | Hcj | Br | Hcj | Br | Hcj |
| | | 13.72 | 26.51 | 13.73 | 26.48 | 13.76 | 23.9 | 13.8 | 18.89 | 13.79 | 18.89 |
| | Sample No. | (5, 1) | | (5, 2) | | (5, 3) | | (5, 6) | | (5, 8) | |
| | Coercivity | Br | Hcj | Br | Hcj | Br | Hcj | Br | Hcj | Br | Hcj |
| | | 13.61 | 26.63 | 13.62 | 29.62 | 13.66 | 27.55 | 13.8 | 18.89 | 13.8 | 18.89 |

As illustrated in FIG. 1 above and shown in FIGS. 7-10, the method in accordance with the present invention effectively diffuses the heavy rare earth elements to the edge of the Nd—Fe—B magnet block thereby forming the gradient magnet including the edge portion, the transition portion, and the central portion.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A gradient Nd—Fe—B magnet comprising:

an Nd—Fe—B magnet block extending along a magnetization direction and having a plurality of surfaces perpendicular to said magnetization direction;

a first film containing at least one heavy rare earth element, disposed on one of said surfaces, attached to said Nd—Fe—B magnet block and extending along a periphery of said one of said surfaces and wherein said first film only covers an area of 10% to 65% of said one of said surfaces; and a second film containing at least one heavy rare earth element, disposed on another one of said surfaces, opposite of said one of said surfaces, attached to said Nd—Fe—B magnet block and extending along a periphery of said another one of said surfaces and wherein said second film only covers an area of 10% to 65% of said another one of said surfaces; and said first film and said second film being diffused into said Nd—Fe—B magnet block dividing said Nd—Fe—B magnet block into an edge region, a transition region, and a central region along a plane extending perpendicular to said magnetization direction;

wherein said edge region has a coercivity that remains constant in a direction perpendicular to said magnetization direction, and said coercivity of said edge region, along said magnetization direction, gradually decreases from said one of said surfaces and said another one of said surfaces towards a point located between said one of said surfaces and said another one of said surfaces; and wherein said transition region extends about said center region and said edge region extends about said transition region in concentric relationship.

2. The gradient Nd—Fe—B magnet as set forth in claim 1 wherein said transition region has a coercivity that decreases toward said central portion in said direction perpendicular to said magnetization direction and said coercivity of said transition region, along said magnetization direction, gradually decreases from said one of said surfaces and said another one of said surfaces to said point between said one of said surfaces and said another one of said surfaces.

3. The gradient Nd—Fe—B magnet as set forth in claim 1 wherein said center region has a coercivity that remains constant in said direction perpendicular to said magnetization direction and along said magnetization direction.

4. The gradient Nd—Fe—B magnet as set forth in claim 1 wherein an average of said coercivity of said edge region is greater than an average of said coercivity of said transition region and said average of said coercivity of said transition region is greater than an average of said coercivity of said central region.

5. The gradient Nd—Fe—B magnet as set forth in claim 1 wherein said Nd—Fe—B magnet block has a thickness of between 2-10 mm along said magnetization direction.

6. The gradient Nd—Fe—B magnet as set forth in claim 1 wherein said Nd—Fe—B magnet block has a length and a width of at least 10 mm.

7. The gradient Nd—Fe—B magnet as set forth in claim 1 wherein said at least one heavy rare earth element is selected from Tb, Dy, and an alloy containing Dy or Tb.

8. The gradient Nd—Fe—B magnet as set forth in claim 1 wherein said first film and said second film are attached to said Nd—Fe—B magnet block by melting a powder containing said at least one heavy rare earth metal on said one and said another one of the surfaces and along said periphery using a laser.

9. The gradient Nd—Fe—B magnet has set forth in claim 8 wherein said at least one heavy rare earth element is selected from Tb, Dy, and an alloy containing Dy or Tb and is present in said powder in an amount of 0.1 wt. % and 2 wt. %.

10. The gradient Nd—Fe—B magnet a set forth in claim 8 wherein said powder has an average particle size of between 1 μm and 300 μm.

11. The gradient Nd—Fe—B magnet a set forth in claim 8 wherein said powder melted into said first film only forms said first film along the periphery of said one of the surfaces and the excess powder not melted into said first film is removed from said one of the surfaces.

12. The gradient Nd—Fe—B magnet a set forth in claim 11 wherein said powder melted into said second film only forms said second film along the periphery of said another one of the surfaces and the excess powder not melted into said second film is removed from said another one of the surfaces.

13. A method of making the gradient Nd—Fe—B magnet of claim 1, said method including the steps of:

providing the Nd—Fe—B magnet block having a thickness of between 2-10 mm along the magnetization direction and having the surfaces perpendicular to the magnetization direction;

placing the Nd—Fe—B magnet block in a chamber containing an inert gas of argon with the magnetization direction of the Nd—Fe—B magnet block being arranged in a vertical direction;

depositing a powder, containing at least one heavy rare earth element, on the one of the surfaces;

forming the first film containing the at least one heavy rare earth element on the one of the surfaces and along the periphery of the one of the surfaces;

said step of forming the first film further including a step of melting the powder on the one of the surfaces and along the periphery using a laser to form the first film and adhering the first film to the periphery;

removing excess powder from the one of the surfaces;

rotating the Nd—Fe—B magnet block 180°;

depositing the powder, containing at least one heavy rare earth element, on the another one of the surfaces opposite of the one of the surfaces;

forming the second film containing the at least one heavy rare earth element on the another one of the surfaces and along the periphery of the another one of the surfaces;

said step of forming the second film further including a step of melting the powder on the another one of the surfaces and along the periphery using a laser to form the second film and adhering the second film to the periphery;

removing excess powder from the another one of the surfaces;

diffusing the first film and the second film into the Nd—Fe—B magnet block under a vacuum environment or an inert environment containing argon and at a predetermined temperature.

14. The method as set forth in claim 13 wherein the Nd—Fe—B magnet block has a length and a width of at least 10 mm.

15. The method as set forth in claim 13 wherein the powder has an average particle size of between 1 μm and 300 μm.

16. The method as set forth in claim 13 wherein the at least one heavy rare earth element is selected from a group consisting of Tb, Dy, or an alloy containing Dy or Tb and the powder is present in an amount of 0.1 wt. % and 2 wt. % of the total mass of the Nd—Fe—B magnet block.

17. The method as set forth in claim 13 wherein an area covered by the first film is 10% to 65% of an area covered by the powder on one of the surfaces of the Nd—Fe—B magnet block.

18. The method as set forth in claim 13 wherein an area covered by the second film is 10% to 65% of an area covered by the powder on the another one of the surfaces of the Nd—Fe—B magnet block.

19. The method set forth in claim 13 wherein said step of diffusing is further defined as heating the Nd—Fe—B magnet block including the first film and the second film at the predetermined temperature of between 850° ° C. and 950° C. at a diffusing time of between 6 hours and 72 hours.

20. The method as set forth in claim 19 wherein said step of diffusing further including a step of aging the Nd—Fe—B magnet block including the first film and the second film at an aging temperature of between 450° C. and 650° C. at an aging time of between 3 hours and 15 hours.

* * * * *